United States Patent
Shah et al.

(10) Patent No.: US 11,947,504 B1
(45) Date of Patent: Apr. 2, 2024

(54) MULTI-CLOUD DATA PROCESSING AND INTEGRATION

(71) Applicant: Accenture Global Solutions Limited, Dublin (IE)

(72) Inventors: Vaibhav Mahendrabhai Shah, Pune (IN); Nikhil Prakash Bhandari, Maharashtra (IN); Ankit Gupta, Phursungi (IN); Rashika Dayaram Choudhari, Maharashtra (IN); Anu Saxena, Uttarakhand (IN); Hirendra Parihar, Indore (IN); Kushal Verma, Kashmir (IN); Lalitkumar Maganlal Jain, Maharashtra (IN); Himanshu Nityanand Puranik, Maharashtra (IN); Rajesh Bhat, Bangaluru (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/051,085

(22) Filed: Oct. 31, 2022

(51) Int. Cl.
*G06F 16/21* (2019.01)
*G06F 16/25* (2019.01)

(52) U.S. Cl.
CPC .......... *G06F 16/214* (2019.01); *G06F 16/256* (2019.01); *G06F 16/258* (2019.01)

(58) Field of Classification Search
CPC ..... G06F 16/214; G06F 16/256; G06F 16/258
USPC ........................................................ 707/609
See application file for complete search history.

(56) References Cited

U.S. PATENT DOCUMENTS

| | | | |
|---|---|---|---|
| 10,620,991 B1* | 4/2020 | Lindner | G06F 9/5077 |
| 11,825,308 B2* | 11/2023 | Weatherhead | G05B 17/00 |
| 2012/0265742 A1* | 10/2012 | Burckhardt | G06F 9/466 707/694 |
| 2014/0282536 A1* | 9/2014 | Dave | G06Q 30/0631 718/1 |
| 2015/0341230 A1* | 11/2015 | Dave | G06Q 30/02 705/7.29 |
| 2017/0076205 A1* | 3/2017 | Arora | G06Q 10/103 |
| 2018/0144095 A1* | 5/2018 | Fellowes | G16H 10/60 |

* cited by examiner

*Primary Examiner* — Cam Linh T Nguyen
(74) *Attorney, Agent, or Firm* — Harrity & Harrity, LLP

(57) ABSTRACT

In some implementations, a device may receive a request to merge a first cloud computing instance with a second cloud computing instance to generate a multi-cloud computing instance. The device may access a first application programming interface to obtain a first configuration of the first cloud computing instance. The device may access a second application programming interface to obtain a second configuration of the second cloud computing instance. The device may generate a target configuration based on the first configuration or the second configuration. The device may instantiate a set of resources with the target configuration for the multi-cloud computing instance. The device may provide output identifying the multi-cloud computing instance.

20 Claims, 10 Drawing Sheets

MULTI-CLOUD DATA PROCESSING AND INTEGRATION

BACKGROUND

Cloud-to-cloud migration is the process of moving users, projects, data, configurations, preferences, and/or attributes from a first cloud environment to a second cloud environment. Entities may migrate a cloud environment when the entity is switching cloud providers or switching hardware resources for supporting a cloud environment. Sometimes, rather than migrating a single cloud instance from a first cloud environment to a second cloud environment, an entity may merge multiple cloud instances to create a multi-cloud instance. Merging of cloud instances may occur when entities have rolled out multiple cloud instances for, for example, multiple regions but no longer desire to have different hardware supporting the multiple cloud instances.

SUMMARY

Some implementations described herein relate to a method. The method may include receiving, by a device, a request to merge a first cloud computing instance with a second cloud computing instance to generate a multi-cloud computing instance. The method may include accessing, by the device, a first application programming interface to obtain a first configuration of the first cloud computing instance, where the first configuration of the first cloud computing instance is associated with first metadata in a first format identifying a first set of values for a set of attributes of the first cloud computing instance. The method may include accessing, by the device, a second application programming interface to obtain a second configuration of the second cloud computing instance, where the second configuration of the second cloud computing instance is associated with second metadata in a second format identifying a second set of values for the set of attributes. The method may include selecting, by the device, a source configuration for one or more conflicting values for attributes of the set of attributes. The method may include generating, by the device, a target configuration for an integrated multi-cloud using the source configuration for the one or more conflicting values for attributes and a mutually identified configuration for one or more non-conflicting values for attributes of the set of attributes. The method may include instantiating, by the device, a set of resources with the target configuration for the multi-cloud computing instance. The method may include providing, by the device, output identifying the multi-cloud computing instance.

In some implementations, a device includes one or more memories; and one or more processors, coupled to the one or more memories, configured to: receive training data for merging metadata, wherein the training data includes data identifying a set of merged cloud computing instances associated with metadata in a set of formats; and train a metadata merging model for merging metadata using the training data for merging metadata; receive a request to merge a first cloud computing instance with a second cloud computing instance to generate a multi-cloud computing instance; access a first application programming interface to obtain a first configuration of the first cloud computing instance, wherein the first configuration of the first cloud computing instance is associated with first metadata in a first format identifying a first set of values for a set of attributes of the first cloud computing instance; access a second application programming interface to obtain a second configuration of the second cloud computing instance, wherein the second configuration of the second cloud computing instance is associated with second metadata in a second format identifying a second set of values for the set of attributes; select a source configuration for one or more conflicting values for attributes of the set of attributes; generate, using the metadata merging model, a target configuration for an integrated multi-cloud using the source configuration for the one or more conflicting values for attributes and a mutually identified configuration for one or more non-conflicting values for attributes of the set of attributes; and instantiate a set of resources with the target configuration for the multi-cloud computing instance; and provide output identifying the multi-cloud computing instance.

Some implementations described herein relate to a non-transitory computer-readable medium that stores a set of instructions for a device. The set of instructions, when executed by one or more processors of the device, may cause the device to receive a request to merge a first cloud computing instance with a second cloud computing instance to generate a multi-cloud computing instance. The set of instructions, when executed by one or more processors of the device, may cause the device to access a first application programming interface to obtain a first configuration of the first cloud computing instance. The set of instructions, when executed by one or more processors of the device, may cause the device to access a second application programming interface to obtain a second configuration of the second cloud computing instance. The set of instructions, when executed by one or more processors of the device, may cause the device to select a source configuration for one or more conflicting values for attributes of the set of attributes. The set of instructions, when executed by one or more processors of the device, may cause the device to generate a target configuration for an integrated multi-cloud using the source configuration for the one or more conflicting values for attributes and a mutually identified configuration for one or more non-conflicting values for attributes of the set of attributes. The set of instructions, when executed by one or more processors of the device, may cause the device to instantiate a set of resources with the target configuration for the multi-cloud computing instance. The set of instructions, when executed by one or more processors of the device, may cause the device to generate a user interface including information identifying a mapping between the target configuration and the first metadata and the second metadata. The set of instructions, when executed by one or more processors of the device, may cause the device to provide the user interface as output identifying the multi-cloud computing instance.

DETAILED DESCRIPTION

The following detailed description of example implementations refers to the accompanying drawings. The same reference numbers in different drawings may identify the same or similar elements.

Cloud instances (e.g., different instances of a cloud application) may store code and/or configuration data as metadata in different types of formats. For example, a cloud instance may store metadata identifying a set of attributes of the cloud instance in an extensible markup language (XML) file or a JavaScript Object Notation (JSON) file. Some cloud instances may have multiple different types of metadata files and each type of metadata file may differ with regard to structure or identified attributes. Some types of metadata files may have a hierarchical relationship, such that a parent metadata type may have one or more child metadata types.

When merging cloud instances into a single multi-cloud instance, complex sets of metadata and different metadata types may result in conflicts between attribute values associated with different cloud instances. Accordingly, merging cloud instances may result in configuration errors, which may prevent usage of a cloud application in merged multi-cloud instances. This may result in organizations maintaining cloud instances separately to avoid these configuration errors, which may result in an excessive, inefficient use of physical computing resources to support multiple, separate cloud instances.

Some implementations described herein provide a multi-cloud integration framework. For example, a metadata merging platform may analyze different sets of metadata in different formats from different cloud instances and identify conflicting and non-conflicting attributes. The metadata merging platform may merge the non-conflicting attributes and determine a dominant state for the conflicting attributes. The metadata merging platform may use the dominant state for the conflicting attributes to merge the conflicting attributes, thereby enabling setup of a multi-cloud instance from multiple cloud instances that have different attributes. In this way, the metadata merging platform enables a reduction in a usage of computing resources by enabling entities to stop excessive usage of resources to support multiple cloud instances.

Figure 1A:
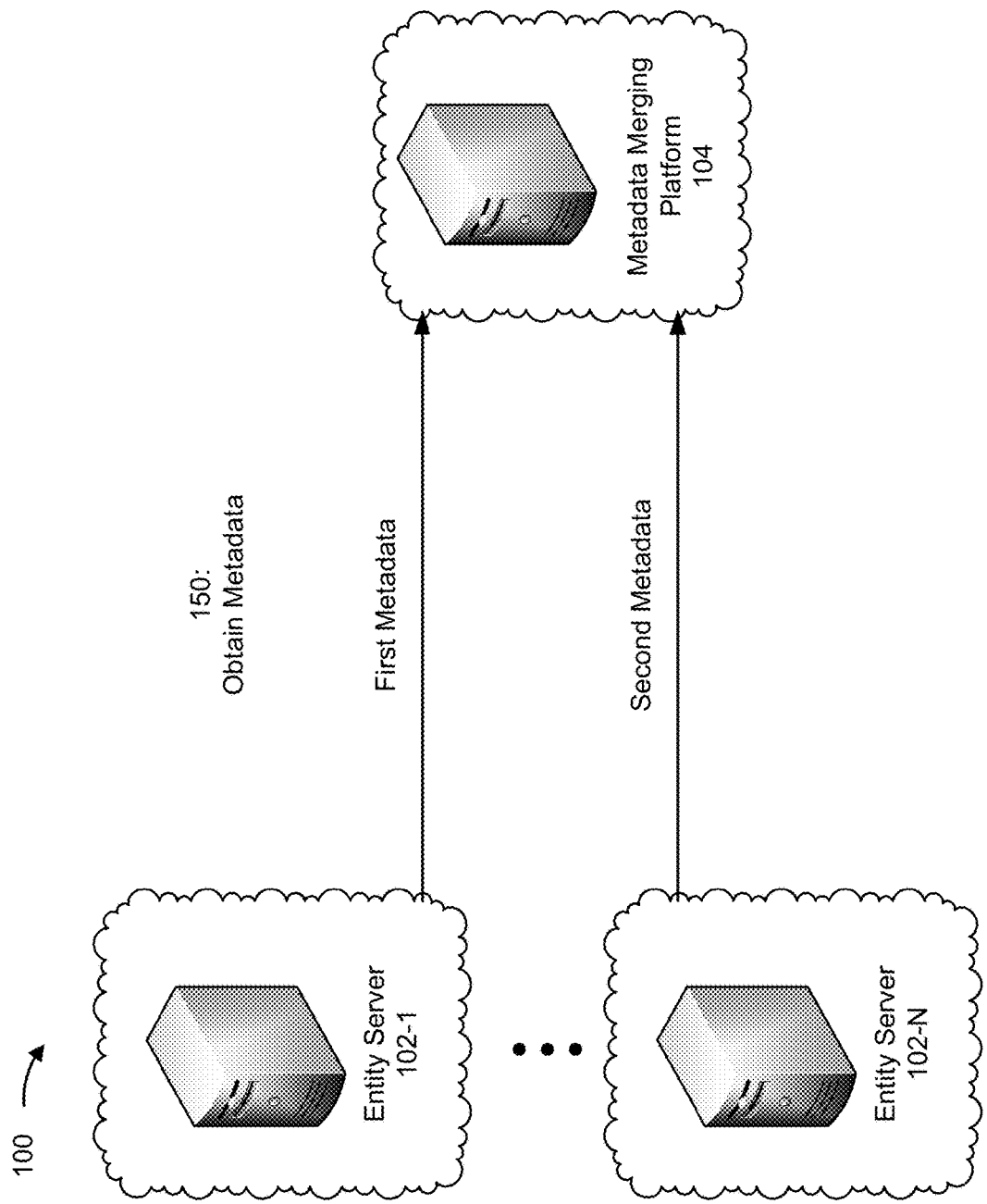
FIGS. 1A-1F are diagrams of an example implementation associated with multi-cloud data processing and integration.

FIGS. 1A-1F are diagrams of an example implementation 100 associated with multi-cloud data processing and integration. As shown in FIG. 1A, example implementation 100 includes a set of entity servers 102-1 through 102-N and a metadata merging platform 104. These devices are described in more detail below in connection with FIG. 3 and FIG. 4.

As further shown in FIG. 1A, and by reference number 150, the metadata merging platform 104 may obtain metadata. For example, the metadata merging platform 104 may obtain metadata from a set of entity servers 102. In this case, the set of entity servers 102 may store metadata associated with a set of cloud instances for a set of entities. For example, different entities may instantiate cloud instances of, for example, a cloud application, such as a resource management cloud application. In this case, an entity server 102 may store information associated with a cloud instance, such as a metadata file (e.g., an extensible markup language (XML) file or a JavaScript object notation (JSON) file) storing code and configuration information associated with the cloud instance. In this case, the metadata merging platform 104 may obtain, for example, first metadata associated with a first cloud instance and second metadata associated with a second cloud instance. Although some aspects are described herein in terms of merging two cloud instances, other quantities of cloud instances may be merged into a single multi-cloud instance.

A cloud instance may be associated with different metadata attributes, in some implementations. For example, a cloud instance may have, within metadata representing the cloud instance, attributes identifying a set of objects, a set of applications, a set of tabs, a set of custom self-contained components, a set of groups, a set of queues, a set of templates (e.g., communication templates, such as email templates), a set of processes or process builders, a set of pages, a set of classes, a set of profiles, or a set of permission sets. In this case, different attribute values may represent different configurations for a metadata attribute. For example, a first value for a set of profiles attribute may indicate a first set of profiles, and a second value for the set of profiles attribute may indicate a second set of profiles. Some metadata attributes may be hierarchically linked to other metadata attributes. For example, a set of objects, profiles, or permission sets may link to a layout, a workflow rule, a record type, a trigger, a field, an object level permission, or a field level permission metadata attribute. Similarly, the workflow rules metadata attribute may link to an email alert attribute, a field update attribute, a task attribute, or an outbound messages attribute. In this way, different metadata attributes may have different linkages that the metadata merging platform 104 may identify when parsing metadata, as described in more detail herein, and that the metadata merging platform 104 may use to instantiate a multi-cloud instance.

In some implementations, the metadata merging platform 104 may obtain metadata associated with different applications. For example, different cloud applications may have different types of metadata files. Additionally, or alternatively, different metadata files may be associated with different metadata types with different structures (e.g., hierarchies) and attributes. For example, a parent metadata type for a cloud application may have multiple different child metadata types nested in or hierarchically linked to the parent metadata type to represent metadata of a cloud instance.

In some implementations, the metadata merging platform 104 may obtain metadata for training a model. For example, the metadata merging platform 104 may obtain metadata associated with a set of cloud instances and merged metadata associated with a set of multi-cloud instances to train a metadata merging model, as described in more detail herein. In this case, the metadata merging platform 104 may identify merged multi-cloud instances, obtain data regarding merging of the multi-cloud instances (e.g., previous artificial intelligence selections for merging or previous user selections for merging) and use the data regarding the merging to train or re-train the metadata merging model to enable merging of first metadata from a first cloud instance with second metadata from a second cloud instance.

Figure 1B:
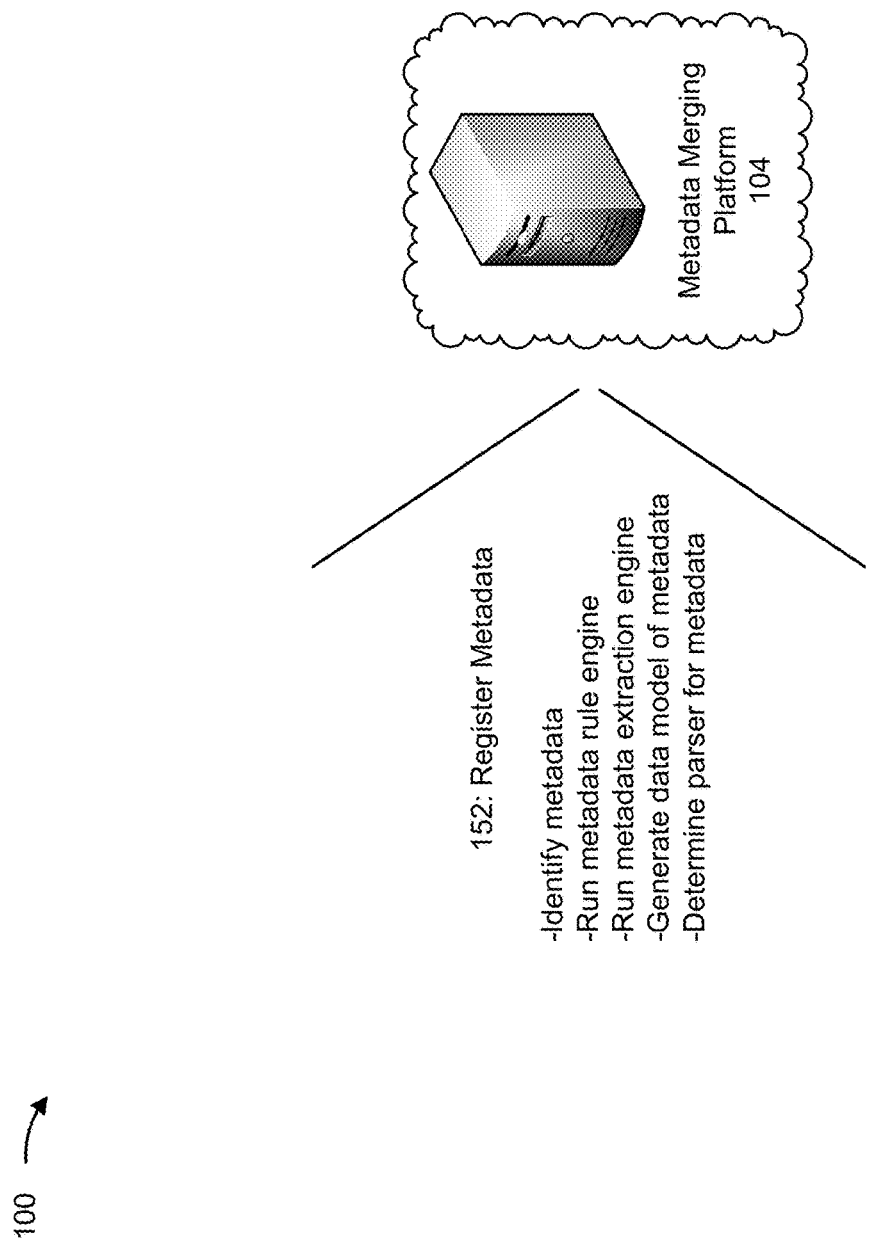

As shown in FIG. 1B, and by reference number 152, the metadata merging platform 104 may register the metadata. For example, the metadata merging platform 104 may process the metadata received from the entity servers 102 to register the metadata for extraction. In some implementations, the metadata merging platform 104 may use a metadata registration engine or a metadata registration algorithm to register the metadata. Registering the metadata may include identifying a type of the metadata, running a metadata rule engine to use one or more rules to determine whether the metadata is in a format with which the metadata merging platform 104 is compatible, running a metadata extraction engine to obtain a set of collections or mappings of the metadata (e.g., a structure of the metadata), generating a data model of the metadata, determining a parser for a type of the metadata, and parsing the metadata using the parser, as described in more detail herein.

The metadata merging platform 104 may classify the metadata in connection with registering the metadata. For example, in a first scenario, the metadata merging platform 104 may determine that received metadata is associated with a new cloud instance (e.g., that has not been previously analyzed by the metadata merging platform 104). In this case, the metadata merging platform 104 may determine that metadata for the new cloud instance is to be registered for extraction. In a second scenario, the metadata merging platform 104 may determine that received metadata is associated with a previously processed cloud instance and has not changed from the previous processing. In this case, the metadata merging platform 104 may obtain an already parsed version of the metadata from a data structure rather than registering the metadata. In a third scenario, the metadata merging platform 104 may determine that the metadata is associated with a previously processed cloud instance, but has changed from the previous processing. In this case, the metadata merging platform 104 may determine to register the changes to the metadata and parse the changes to update the already parsed version of the metadata. By performing the aforementioned classification, the metadata merging platform 104 avoids re-parsing previously parsed metadata, thereby reducing a utilization of processing resources.

In some implementations, the metadata merging platform 104 may generate a set of collections or mappings of metadata when registering metadata. For example, the metadata merging platform 104 may generate a primary metadata collection, which includes all metadata from a metadata file that the metadata merging platform 104 has received. Additionally, or alternatively, the metadata merging platform 104 may generate a parent metadata collection or mapping, which includes metadata that has nested or related metadata linked thereto. Additionally, or alternatively, the metadata merging platform 104 may generate a child metadata collection or mapping, which includes nested ore related metadata assigned to some parent metadata.

In some implementations, to register the metadata, the metadata merging platform 104 may check for metadata existence to register metadata. For example, the metadata merging platform 104 may determine whether the metadata merging platform 104 has previously processed a portion of metadata, as described above. In this case, the metadata merging platform 104 may use the already processed portion of the metadata or may use an already identified technique for merging the portion of metadata into a format that the metadata merging platform 104 can use for subsequent processing. In some implementations, to register the metadata, the metadata merging platform 104 may determine whether a portion of metadata satisfies one or more compatibility rules. The compatibility rules may be a set of rules for whether the portion of metadata can be processed using the metadata merging platform 104. For example, the compatibility rules may include a format of the metadata, a structure of the metadata, a type of the metadata, or a size of the metadata, among other examples. If the metadata merging platform 104 identifies a compatibility issue (e.g., a lack of compatibility), the metadata merging platform 104 may generate a user interface with the incompatible metadata provided for display to enable user input associated with extracting the metadata (e.g., user selection of one or more attributes, attribute values, or relationships, among other examples). If the metadata merging platform 104 does not identify a compatibility issue (or the compatibility issue is resolved with, for example, user input), the metadata merging platform 104 may automatically extract a structure of the metadata and store the metadata in one or more collections, as described above, as a data model of the metadata. Based on identifying the relationships between metadata attributes for the data model of the metadata, the metadata merging platform 104 can extract, parse, and merge the metadata as described herein.

In some implementations, the metadata merging platform 104 may generate a set of parsers for reading the metadata. A parser may include an algorithm for extracting values from metadata. For example, the metadata merging platform 104 can determine a structure of the metadata from the metadata itself, but uses a parser as an algorithm for extracting specific values for metadata attributes from the metadata. The parser may be associated with identifying values and ignoring other syntactical elements of the metadata, such as other code, or other artifacts, indications of structure, among other examples. Each parser may correspond to a particular metadata type. Accordingly, the metadata merging platform 104 may generate multiple parsers for parsing multiple metadata types within a single metadata file. Based on identifying a structure of the metadata (e.g., the relationships between metadata attributes), the metadata merging platform 104 may identify an existing parse or generate a configuration table or a parser to process metadata attributes in accordance with the relationships. By creating parsers dynamically, the metadata merging platform 104 can be applied to many different types of cloud instances, rather than being statically configured for processing and merging a single type of cloud instance.

Figure 1C:
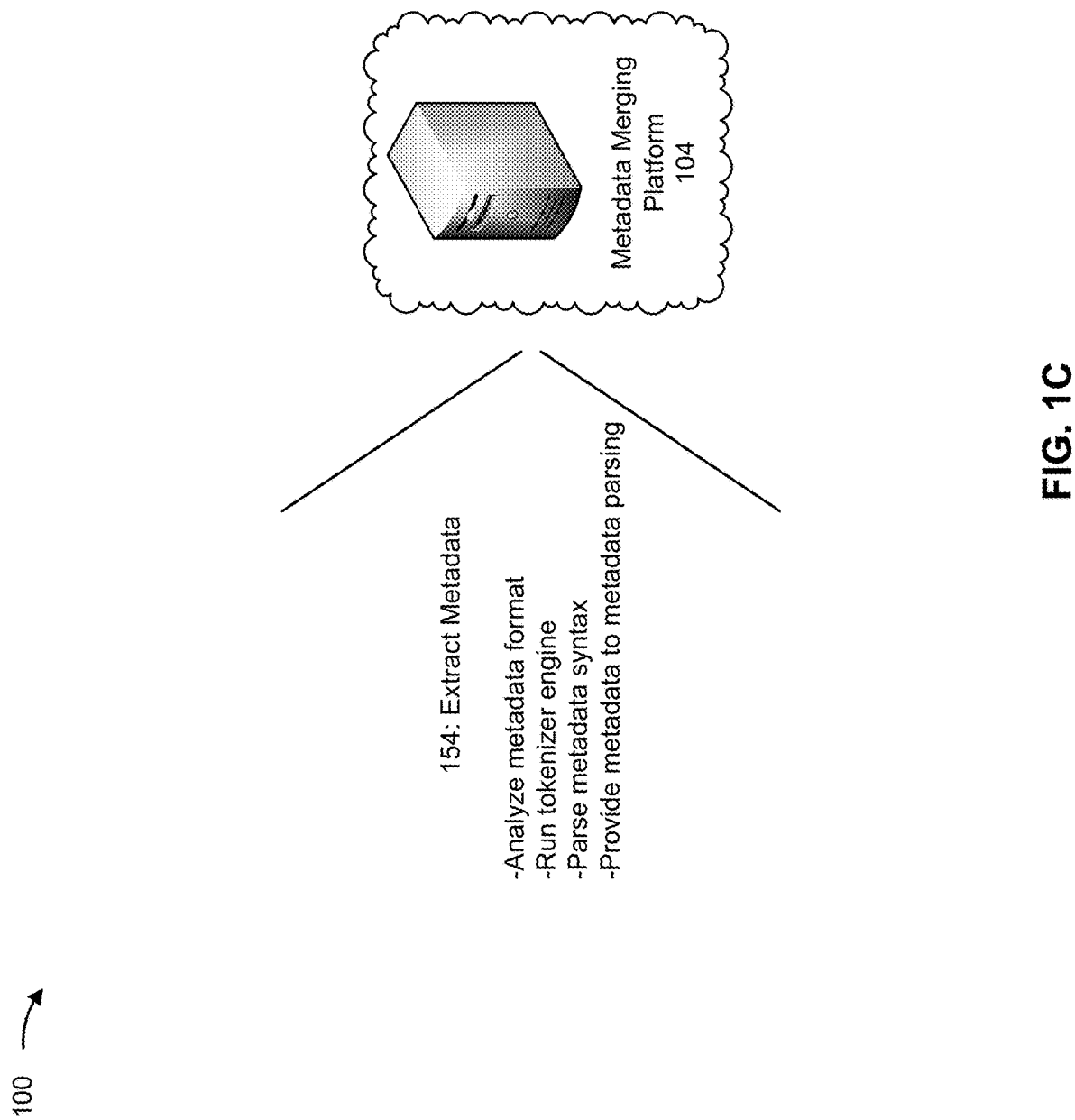

As shown in FIG. 1C, and by reference number 154, the metadata merging platform 104 may extract the metadata. For example, based on registering the metadata (e.g., identifying the metadata structure), the metadata merging platform 104 may extract the metadata. Extracting the metadata may include analyzing a metadata format, tokening the metadata (e.g., characters of the metadata), parsing a metadata syntax using tokens of metadata, and providing the metadata for further parsing based on the syntax of the metadata, as described in more detail herein.

In some implementations, the metadata merging platform 104 may apply a metadata format analyzer engine. The metadata format analyzer engine may use a set of rules for a file format of the metadata (e.g., an XML file format or a JSON file format, among other examples) to pre-process the metadata. Based on analyzing the metadata, the metadata merging platform 104 may extract information from the metadata and store the information as a set of tokenized portions of metadata (e.g., by breaking code of the metadata into a set of tokens representing characters and/or sets of characters). In this case, the metadata merging platform 104 may apply a metadata syntax parser to parse tokens or combinations of tokens to identify metadata syntax. In other words, the metadata merging platform 104 applies a language processing engine to the metadata. Rather than the language processing engine being configured for natural language, in this case, the language processing engine is configured for metadata language (e.g., XML-based language or JSON-based language). If the metadata merging platform 104 identifies one or more errors in parsing the tokens, the metadata merging platform 104 may generate a user interface and provide information identifying the errors to a user for user selection of, for example, a syntactical unit (e.g., a user may identify a portion of syntax that metadata merging platform 104 does not identify). In some implementations, the metadata merging platform 104 may receive a user identified metadata structure. For example, a user may identify a metadata structure (e.g., via the user interface provided by the metadata merging platform 104). The metadata merging platform 104 may generate a new rule for the metadata syntax parser to improve parsing for subsequent processing of metadata.

In some implementations, the metadata merging platform 104 may predict a time complexity for metadata extraction. For example, the metadata merging platform 104 may use an artificial intelligence model to predict a time complexity of metadata extraction based on results of tokening the metadata. In this case, based on predicting the time complexity, the metadata merging platform 104 may allocate resources for metadata extraction. For example, the metadata merging platform 104 may dynamically select resources based on a level of time complexity (e.g., higher time complexity may correspond to selecting more processing resources). In this way, the metadata merging platform 104 can dynamically allocate cloud computing resources to extract metadata, thereby reducing an amount of time relative to a static, lower allocation of resources and avoiding an over-allocation of resources relative to a static, higher allocation of resources (which may allow some resources to be re-allocated to other tasks, thereby enabling more efficient use of a cloud computing environment).

Figure 1D:
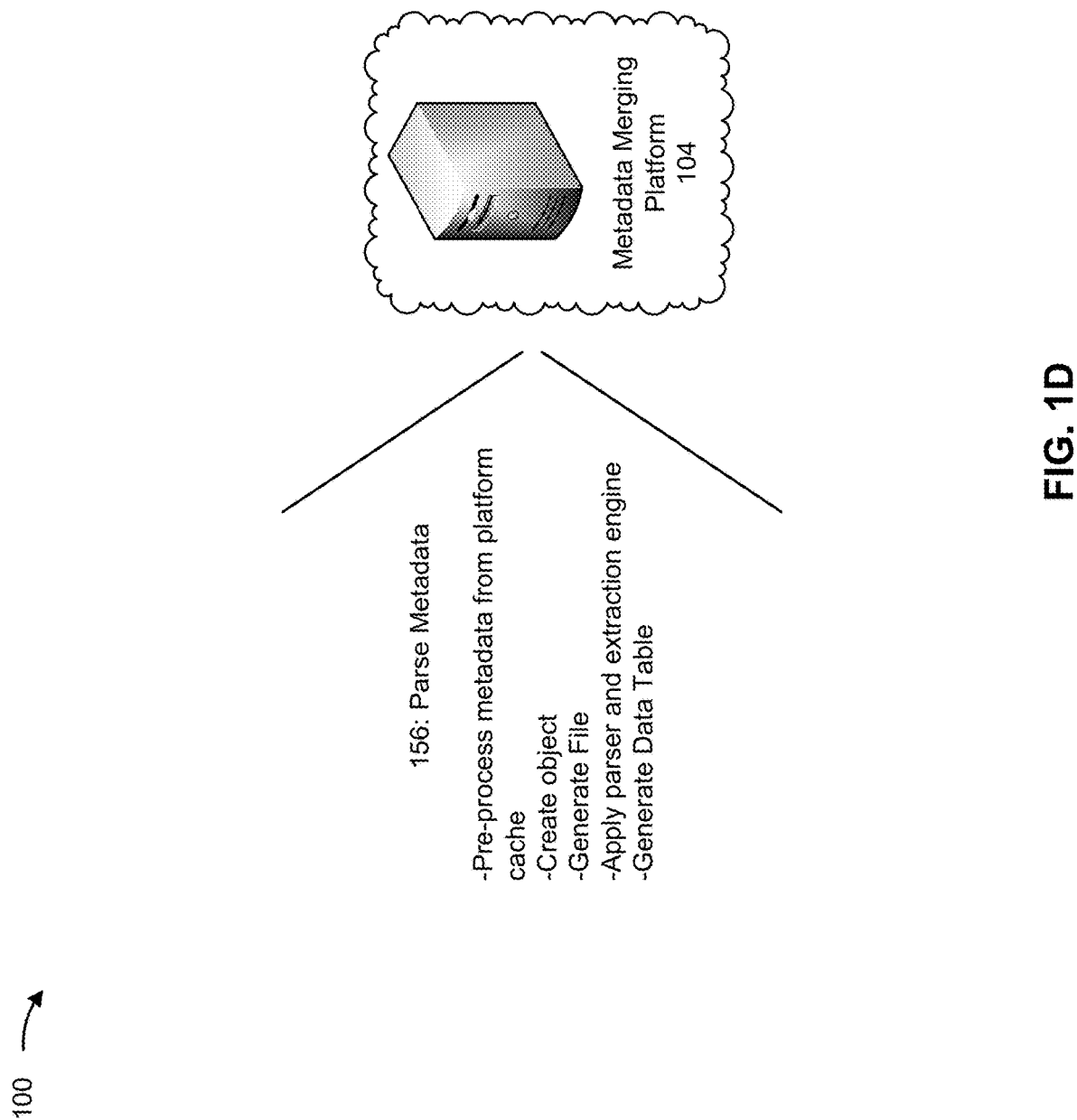

As shown in FIG. 1D, and by reference number 156, the metadata merging platform 104 may parse the metadata. For example, based on extracting the metadata, the metadata merging platform 104 may parse the metadata. Parsing the metadata may include pre-processing the metadata from a platform cache (e.g., tokenizing metadata of a primary metadata collection, identifying parent metadata, parsing the parent metadata using a parsing algorithm), generating an object, generating a file (e.g., in a format that can be parsed), applying a parser and extraction engine, and generating a table (e.g., a table of attributes with values and associated hierarchies), as described in more detail herein.

In some implementations, the metadata merging platform 104 may tokenize a collection of metadata attributes. For example, the metadata merging platform 104 may tokenize the primary metadata collection, identify child metadata attributes, linked to a parent metadata attribute, create an object structure (e.g., defines linkages between the child metadata attributes and the parent metadata attribute), generate a file from the object structure, and extract data (such as metadata) from the file using a set of identified parsers to populate data into a data structure, such as a table. In other words, the metadata merging platform 104 uses the structure of the metadata and a set of parsers to merge or convert a format of the metadata into a standard format. In this case, when merging metadata, the metadata merging platform 104 may merge first metadata in a first format and second metadata in a second format into a common third format (e.g., which may be the same as or different from the first or second format). The third format may differ from the first format or the second format by having additional attributes not included in the first format or the second format. In this way, the metadata merging platform 104 enables comparison of attribute values of attributes within respective metadata from respective cloud instances.

Figure 1E:
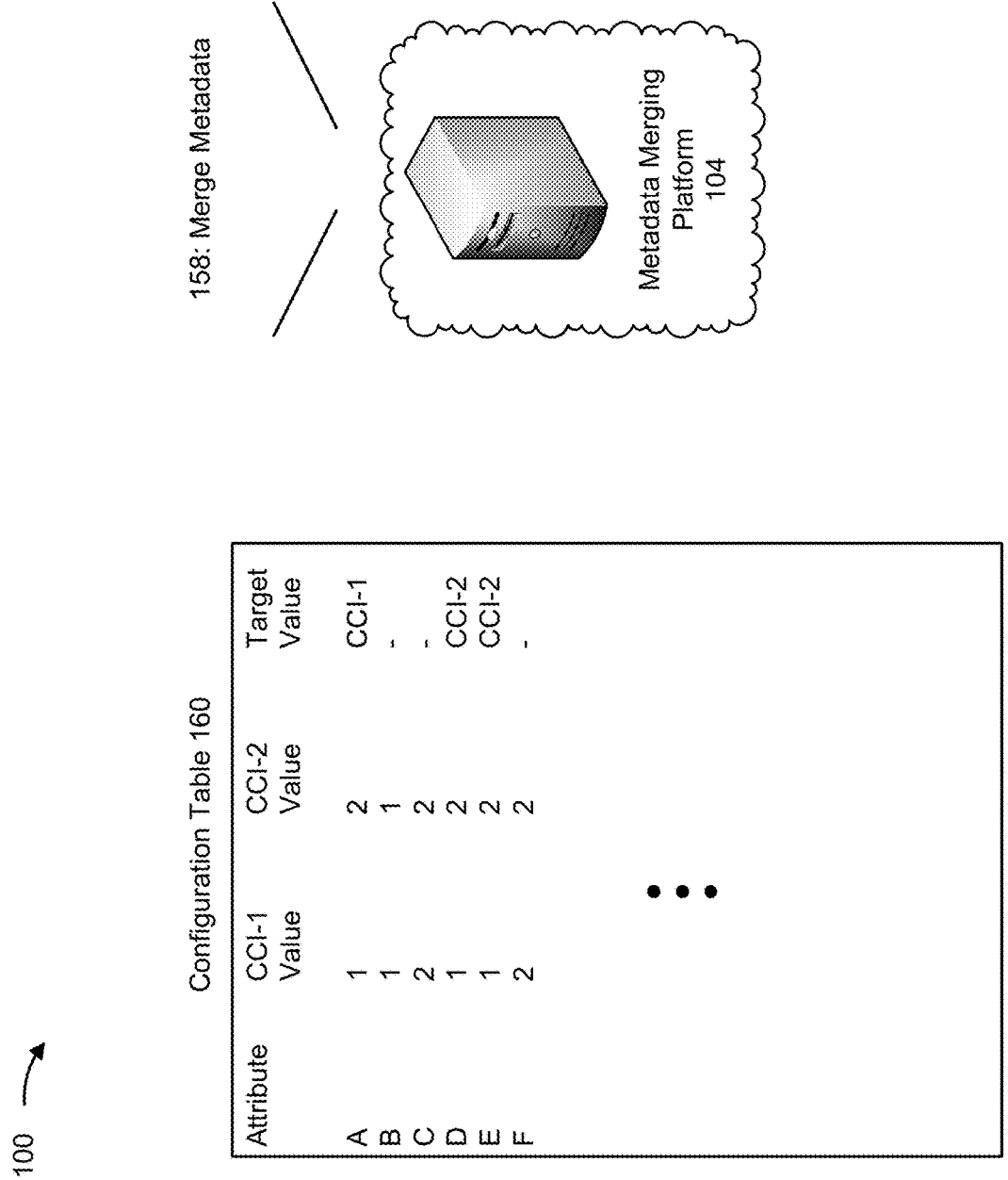

As shown in FIG. 1E, and by reference number 158, the metadata merging platform 104 may merge the metadata. For example, the metadata merging platform 104 may merge first metadata of a first cloud instance with second metadata of a second cloud instance to generate third metadata with which to instantiate a third, multi-cloud instance. Although some implementations are described in terms of merging two cloud instances into a single cloud instance, it is contemplated that other quantities of cloud instances may be possible, such as 3 cloud instances, 4 cloud instances, or greater quantities of cloud instances. In some implementations, the metadata merging platform 104 may identify common components between the first metadata and the second metadata. For example, the metadata merging platform 104 may determine one or more metadata attributes for which there is not a conflict between values. In other words, a metadata attribute, such as a set of email templates, that are common across the first cloud instance and the second cloud instance. For the non-conflicting metadata attributes, the metadata merging platform 104 may merge the first cloud instance and the second cloud instance by selecting the common attribute value. In contrast, for conflicting metadata attributes, where the first cloud instance has a different configuration than the second cloud instance, the metadata merging platform 104 may generate a target configuration, representing which cloud instance is dominant with regard to a particular attribute. For example, the metadata merging platform 104 may use a metadata merging model to predict which attribute value, among a set of conflicting attribute values, is to be selected (e.g., the metadata merging model having been trained on previous selections from among conflicting attribute values). Additionally, or alternatively, the metadata merging platform 104 may generate a user interface identifying one or more conflicting attribute values and may receive a user selection (e.g., which may be fed back to the metadata merging model as feedback information for re-training). As shown by configuration table 160, the metadata merging platform 104 may identify attributes, values in different cloud computing instances (CCIs), and a dominant or target value (e.g., which cloud computing instance to favor for an attribute value that conflicts with a value for another cloud computing instance). In some implementations, the metadata merging platform 104 may automatically select the dominant or target value or may provide configuration table 160 for display via a user interface and receive a user selection.

Figure 1F:
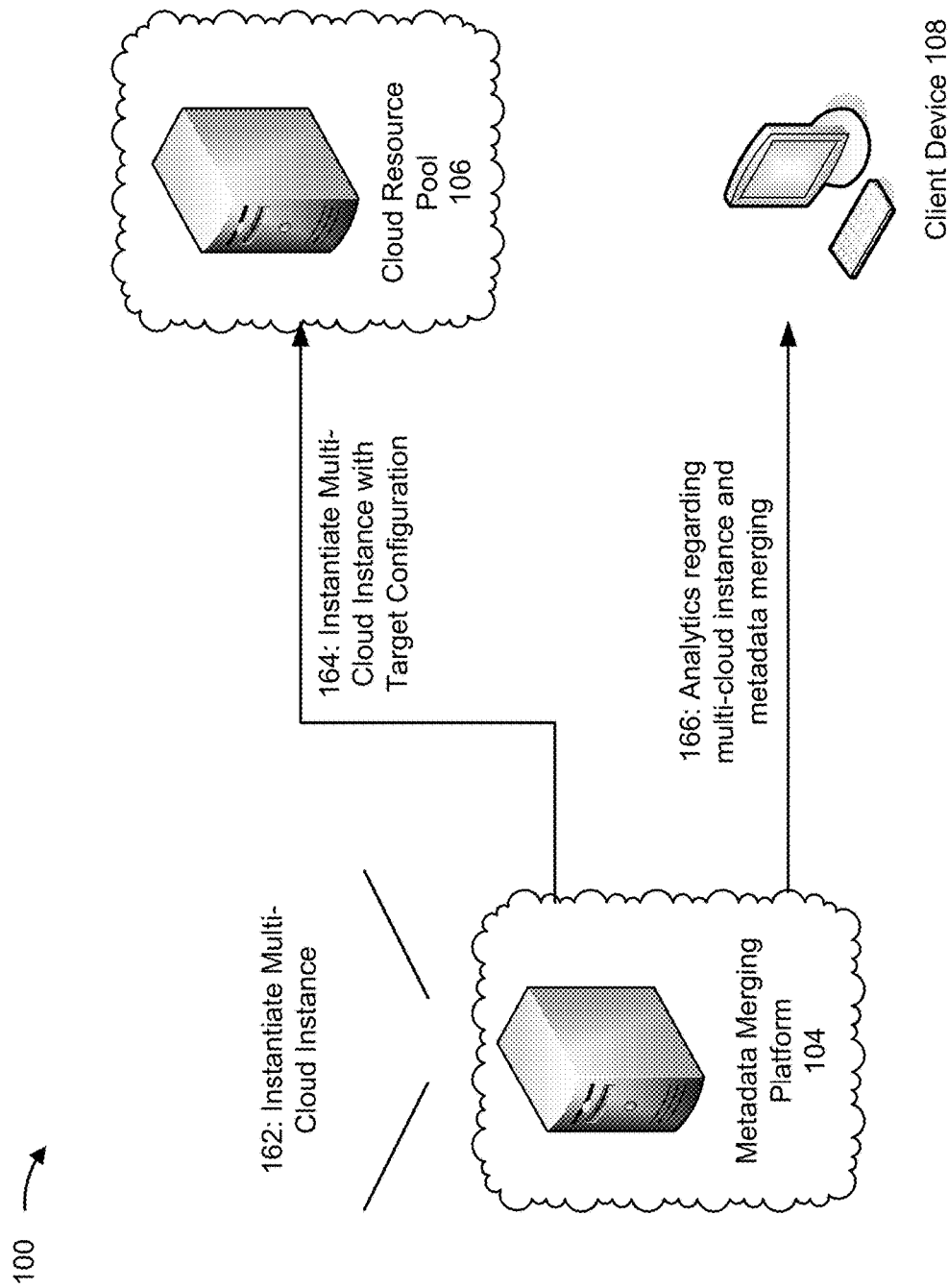

As shown in FIG. 1F, and by reference number 162, the metadata merging platform 104 may instantiate a multi-cloud instance. For example, the metadata merging platform 104 may communicate with a cloud resource pool 106 to allocate a set of resources for a cloud instance with the generated target configuration (e.g., which includes non-conflicting attribute values and dominant attribute values). In this case, the cloud resource pool 106, in connection with the metadata merging platform 104, instantiates a multi-cloud instance of, for example, a cloud application with a merged-in set of attributes from the various component cloud instances from which the multi-cloud instance was generated, as shown by reference number 164. In some implementations, the metadata merging platform 104 may generate a set of analytics regarding the multi-cloud instance and metadata merging, as shown by reference number 166. For example, the metadata merging platform 104 may provide information regarding errors, conflicting attribute values, or predicted merge complexity, among other examples via a user interface of a client device 108.

In some implementations, the metadata merging platform 104 may detect an error when instantiating the multi-cloud instance. For example, the metadata merging platform 104 may determine that a combination of values for a combination of attributes results in an error (e.g., a user interface for which greater than a threshold amount of resources are utilized to access a particular item of information). The metadata merging platform 104 may detect the error based on monitoring usage of the multi-cloud instance, trouble tickets associated with the multi-cloud instance, or a social media feed associated with the multi-cloud instance, among other examples. Based on detecting the error, the metadata merging platform 104 may provide information identifying the error for display via client device 108 and/or a recommendation for changing the combination of attribute values to fix the error. Based on receiving a user selection or confirmation of the recommendation, the metadata merging platform 104 may update the multi-cloud instance to fix the error.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
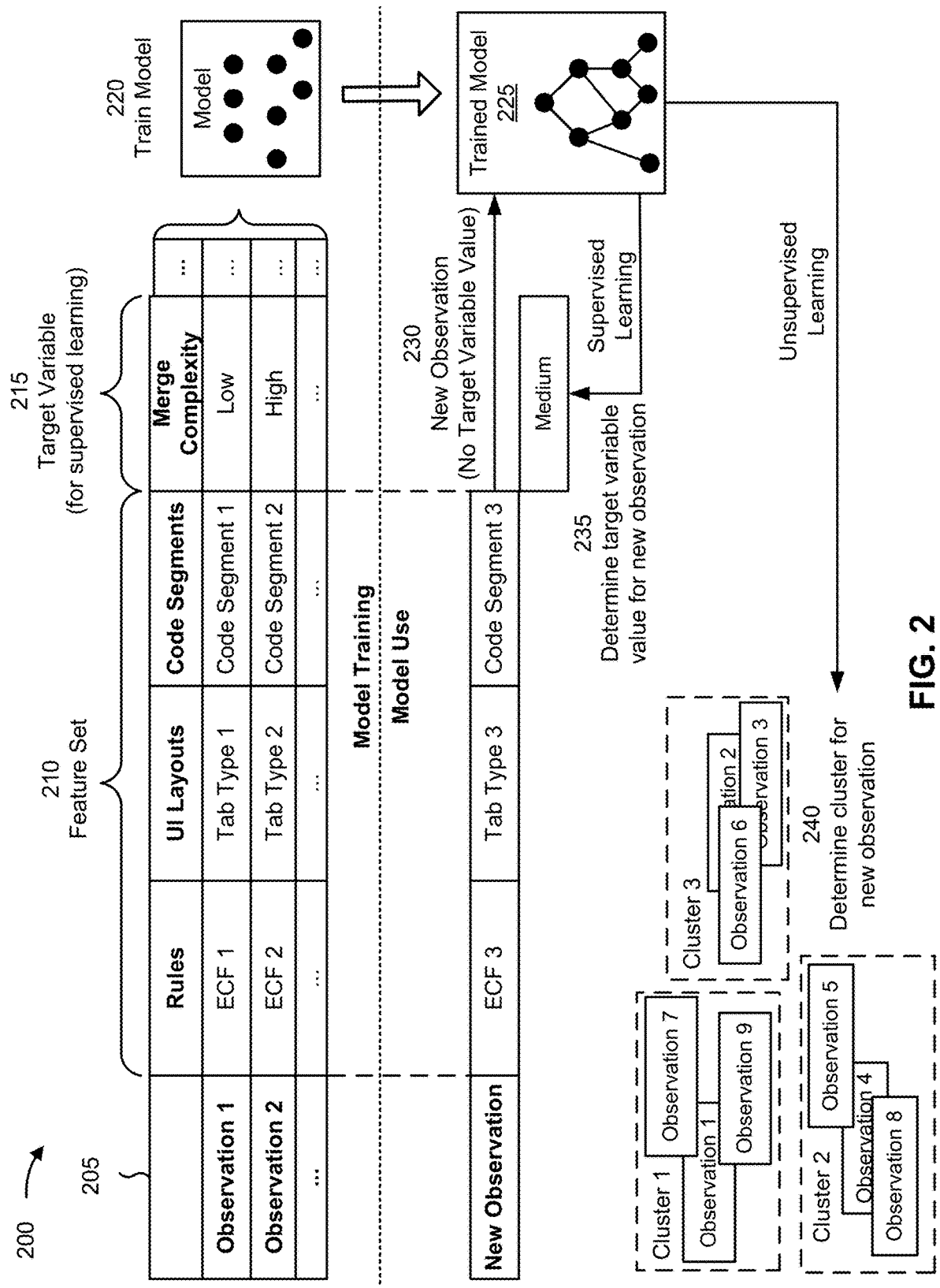
FIG. 2 is a diagram illustrating an example of training and using a machine learning model in connection with multi-cloud data processing and integration.

FIG. 2 is a diagram illustrating an example 200 of training and using a machine learning model in connection with multi-cloud data processing and integration. The machine learning model training and usage described herein may be performed using a machine learning system. The machine learning system may include or may be included in a computing device, a server, a cloud computing environment, or the like, such as the metadata merging platform 301 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from entity server 330, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from entity server 330. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a set of rules (e.g., for classifying information or validating information associated with a cloud instance), a second feature of a set of user interface (UI) layouts (e.g., for UIs displaying information associated with a cloud instance), a third feature of a set of code segments (e.g., classes or methods that have been implemented within a cloud instance), and so on. As shown, for a first observation, the first feature may have a value of a first error condition formula (ECF 1), the second feature may have a value of a first tab type (Tab Type 1), the third feature may have a value of a first code segment (Code Segment 1), and so on. These features and feature values are provided as examples, and may differ in other examples. For example, the feature set may include one or more of the following features: objects, applications, tabs, groups, queues, templates (e.g., email templates), processes, pages, classes, profiles, permission sets, layouts, workflow rules, record types, triggers, fields, object level permissions, field level permissions, alerts, updates, tasks, messages, or any other metadata associated with a cloud instance.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a merge complexity, which has a value of low for the first observation.

The feature set and target variable described above are provided as examples, and other examples may differ from what is described above. For example, for a target variable of which metadata to merge, the feature set may include metadata that can be merged, results of a set of manual metadata merges, or simulation data regarding potential configurations after merging metadata in different ways, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, the machine learning system may train a decision tree algorithm to analyze metadata attributes and determine which metadata attributes, when a conflict occurs between values for multiple cloud computing instances, is to be selected for a merged metadata set and an associated multi-cloud instance. After training, the machine learning system may store the machine learning model as a trained machine learning model 225 to be used to analyze new observations.

As an example, the machine learning system may obtain training data for the set of observations based on stored metadata sets for cloud instances and merged metadata sets for multi-cloud instances. For example, the machine learning system may store data when other metadata sets are merged to merge other cloud instances and use the stored data for training a machine learning model associated with merging metadata. Additionally, or alternatively, the machine learning system may simulate merges of cloud instances by selecting different ways of resolving metadata conflicts between cloud instances and determining an effect of the different ways of resolving metadata conflicts (e.g., determining how many user clicks in a user interface would be used to access various types of information in a user interface of a multi-cloud instance to determine ways of resolving metadata conflicts to optimize subsequent user interface creation).

As shown by reference number 230, the machine learning system may apply the trained machine learning model 225 to a new observation, such as by receiving a new observation and inputting the new observation to the trained machine learning model 225. As shown, the new observation may include a first feature of a third error condition formula (ECF 3), a second feature of a third tab type (Tab Type 3), a third feature of a third code segment (Code Segment 3), and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of medium for the target variable of a merge complexity for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, selecting a first metadata merging algorithm (e.g., from a set of possible metadata merging algorithms). The first automated action may include, for example, allocating a medium allocation of computing resources for processing a merging of cloud computing instances.

As another example, if the machine learning system were to predict a value of high complexity for the target variable of a merge complexity, then the machine learning system may provide a second (e.g., different) recommendation (e.g., a second metadata merging algorithm) and/or may perform or cause performance of a second (e.g., different) automated action (e.g., allocating a high allocation of computing resources, which may be more computing resources, such as more processing resources, than is allocated for the medium allocation of computing resources).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first type of metadata merging, such as metadata merging for a first business type), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a second type of metadata merging, such as metadata merging for a second business type), then the machine learning system may provide a second (e.g., different) recommendation (e.g., the second recommendation described above) and/or may perform or cause performance of a second (e.g., different) automated action, such as the second recommendation described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above. For example, the recommendations associated with identifying a type of metadata may include recommending a particular parser for the type of metadata. The actions associated with identifying a set of relationships between metadata attributes may include, for example, generating a data graph of nodes and edges to represent and enable searching of the metadata attributes in accordance with the set of relationships.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include selections of attribute values from identified conflicting attribute values, errors identified during metadata merging, or usage tracking of user interfaces generated using merged metadata.

In this way, the machine learning system may apply a rigorous and automated process to metadata merging. The machine learning system may enable recognition and/or identification of tens, hundreds, thousands, or millions of features and/or feature values for tens, hundreds, thousands, or millions of observations, thereby increasing accuracy and consistency and reducing delay associated with consolidating cloud instances into a single multi-cloud instance relative to requiring computing resources to be allocated for tens, hundreds, or thousands of operators to manually merge metadata and create a new multi-cloud instance to replace multiple cloud instances using the features or feature values.

As indicated above, FIG. 2 is provided as an example. Other examples may differ from what is described in connection with FIG. 2.

Figure 3:
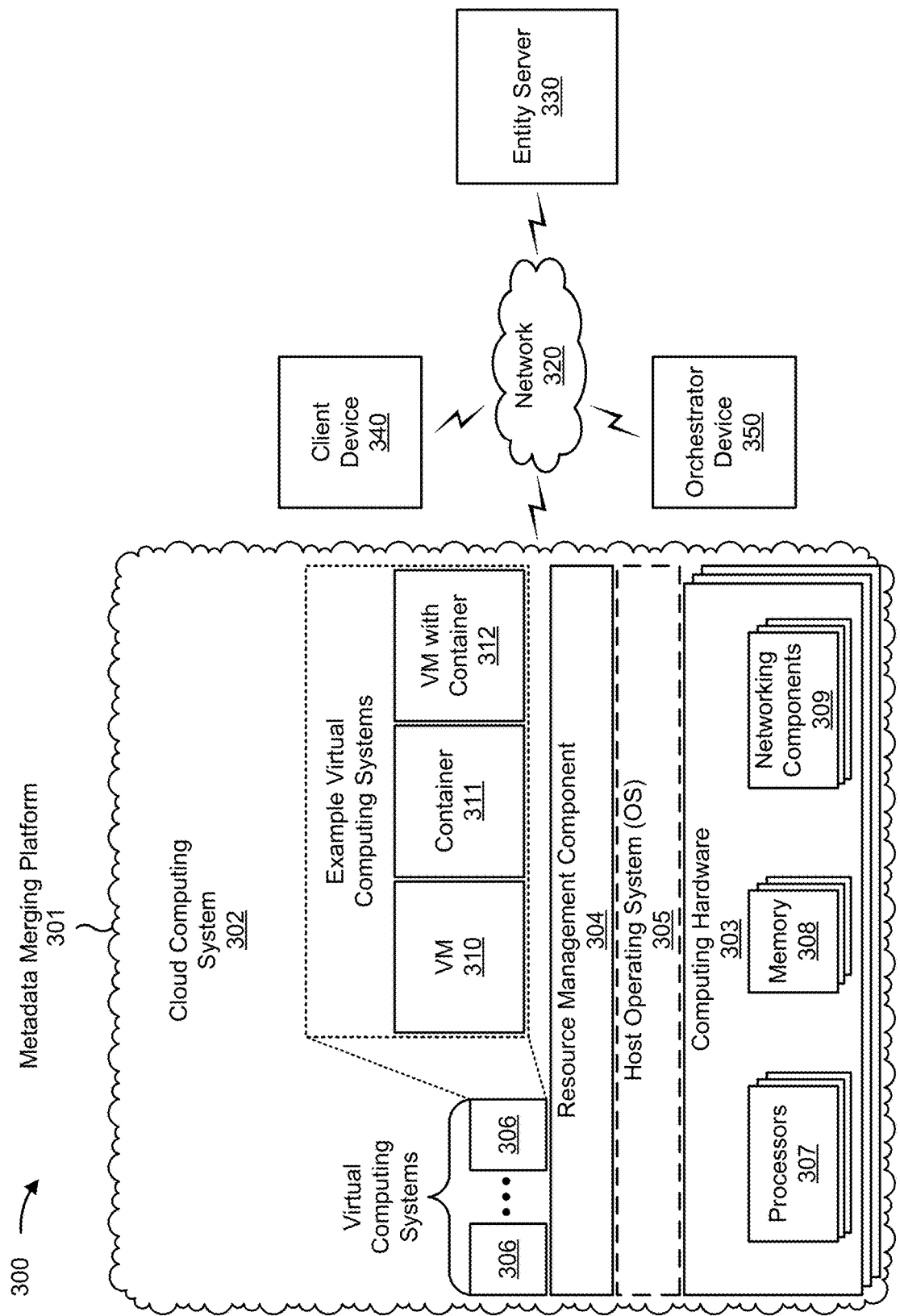
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a metadata merging platform 301, which may include one or more elements of and/or may execute within a cloud computing system 302. The cloud computing system 302 may include one or more elements 303-312, as described in more detail below. As further shown in FIG. 3, environment 300 may include a network 320, an entity server 330, a client device 340, and/or an orchestrator device 350. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the metadata merging platform 301 may include one or more elements 303-312 of the cloud computing system 302, may execute within the cloud computing system 302, and/or may be hosted within the cloud computing system 302, in some implementations, the metadata merging platform 301 may not be cloud-based (e.g., may be implemented outside of a cloud computing system) or may be partially cloud-based. For example, the metadata merging platform 301 may include one or more devices that are not part of the cloud computing system 302, such as device 400 of FIG. 4, which may include a standalone server or another type of computing device. The metadata merging platform 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The entity server 330 may include one or more devices capable of receiving, generating, storing, processing, providing, and/or routing information associated with a cloud instance, as described elsewhere herein. The entity server 330 may include a communication device and/or a computing device. For example, the entity server 330 may include a server, such as an application server, a client server, a web server, a database server, a host server, a proxy server, a virtual server (e.g., executing on computing hardware), or a server in a cloud computing system. In some implementations, the entity server 330 may include computing hardware used in a cloud computing environment.

The client device 340 may include one or more devices capable of receiving, generating, storing, processing, and/or providing information associated with merging metadata or a multi-cloud instance generated from merged metadata, as described elsewhere herein. The client device 340 may include a communication device and/or a computing device. For example, the client device 340 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The orchestrator device 350 may include one or more devices capable of receiving, generating, storing, processing, providing, and/or routing information associated with resource allocations for a multi-cloud instance, as described elsewhere herein. The orchestrator device 350 may include a communication device and/or a computing device. For example, the orchestrator device 350 may include a server, such as an application server, a client server, a web server, a database server, a host server, a proxy server, a virtual server (e.g., executing on computing hardware), a server in a cloud computing system, or an orchestrator thereof. In some implementations, the orchestrator device 350 may include computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
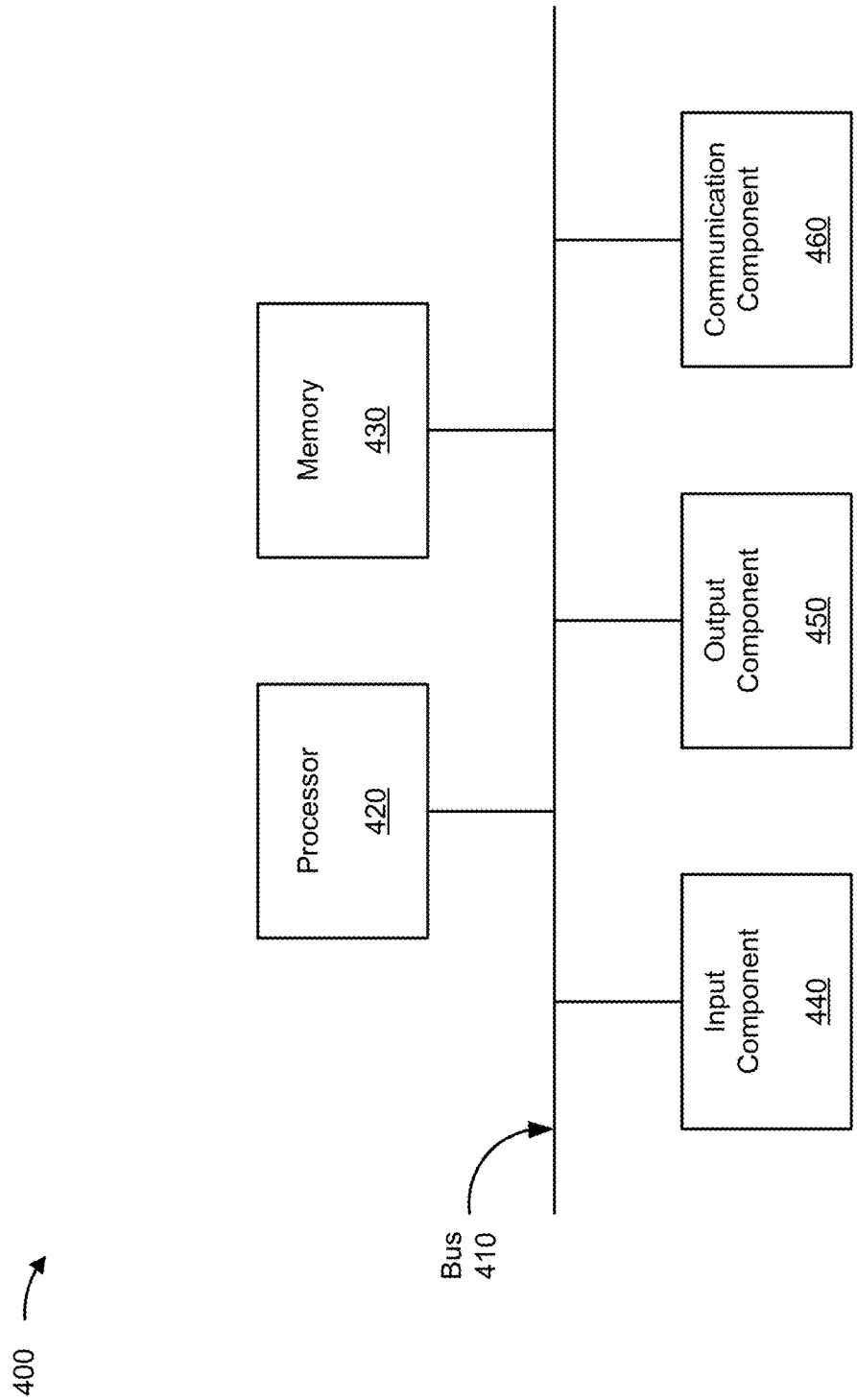
FIG. 4 is a diagram of example components of a device associated with multi-cloud data processing and integration.

FIG. 4 is a diagram of example components of a device 400 associated with multi-cloud data processing and integration. The device 400 may correspond to metadata merging platform 301, entity server 330, client device 340, and/or orchestrator device 350. In some implementations, metadata merging platform 301, entity server 330, client device 340, and/or orchestrator device 350 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
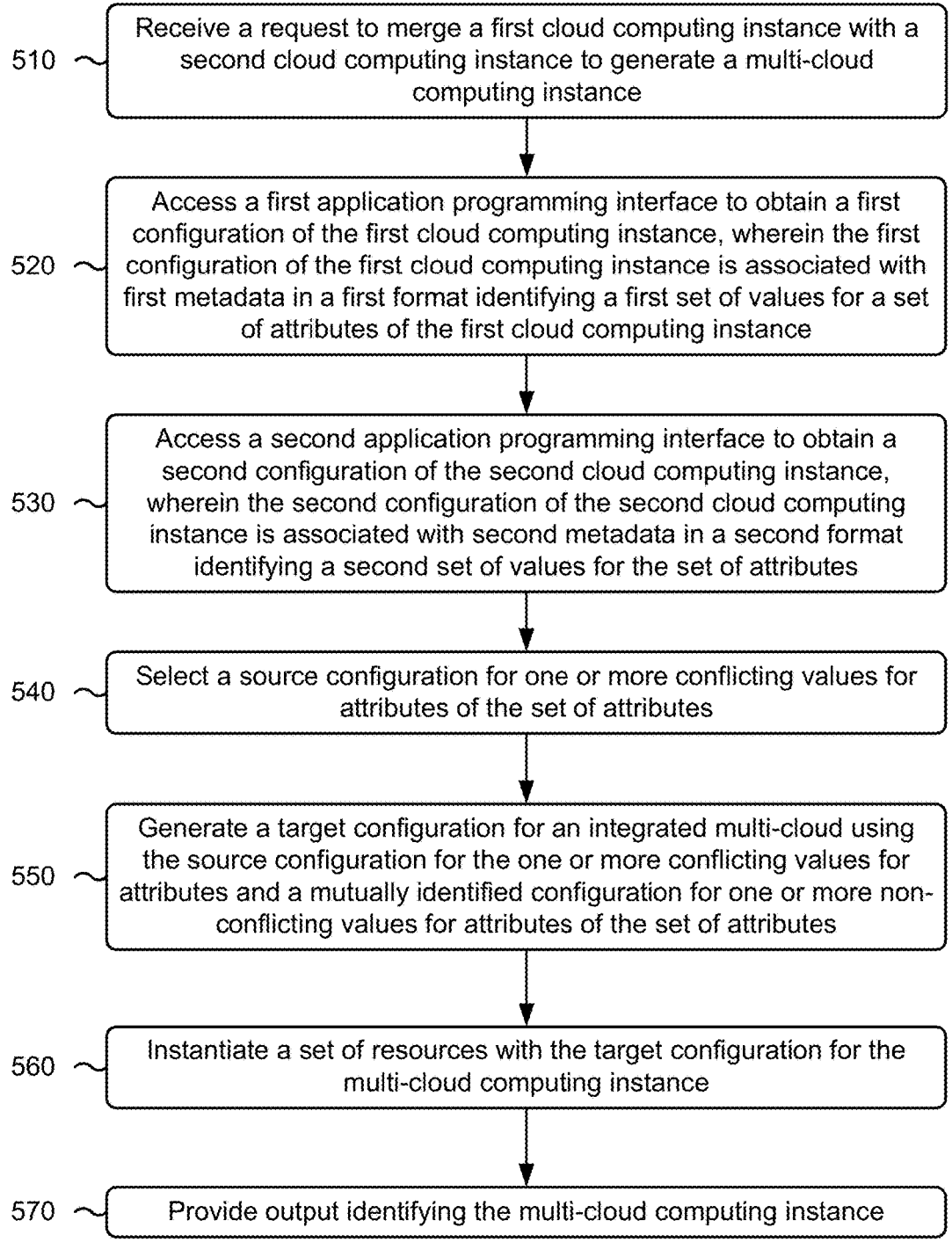
FIG. 5 is a flowchart of an example process associated with multi-cloud data processing and integration.

FIG. 5 is a flowchart of an example process 500 associated with multi-cloud data processing and integration. In some implementations, one or more process blocks of FIG. 5 are performed by a metadata merging platform (e.g., metadata merging platform 301). In some implementations, one or more process blocks of FIG. 5 are performed by another device or a group of devices separate from or including the metadata merging platform, such as an entity server (e.g., entity server 330), a client device (e.g., client device 340), and/or an orchestrator device (e.g., orchestrator device 350). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving a request to merge a first cloud computing instance with a second cloud computing instance to generate a multi-cloud computing instance (block 510). For example, the metadata merging platform may receive a request to merge a first cloud computing instance with a second cloud computing instance to generate a multi-cloud computing instance, as described above.

As further shown in FIG. 5, process 500 may include accessing a first application programming interface to obtain a first configuration of the first cloud computing instance, wherein the first configuration of the first cloud computing instance is associated with first metadata in a first format identifying a first set of values for a set of attributes of the first cloud computing instance (block 520). For example, the metadata merging platform may access a first application programming interface to obtain a first configuration of the first cloud computing instance, as described above. In some implementations, the first configuration of the first cloud computing instance is associated with first metadata in a first format identifying a first set of values for a set of attributes of the first cloud computing instance.

As further shown in FIG. 5, process 500 may include accessing a second application programming interface to obtain a second configuration of the second cloud computing instance, wherein the second configuration of the second cloud computing instance is associated with second metadata in a second format identifying a second set of values for the set of attributes (block 530). For example, the metadata merging platform may access a second application programming interface to obtain a second configuration of the second cloud computing instance, as described above. In some implementations, the second configuration of the second cloud computing instance is associated with second metadata in a second format identifying a second set of values for the set of attributes.

As further shown in FIG. 5, process 500 may include selecting a source configuration for one or more conflicting values for attributes of the set of attributes (block 540). For example, the metadata merging platform may select a source configuration for one or more conflicting values for attributes of the set of attributes, as described above.

As further shown in FIG. 5, process 500 may include generating a target configuration for an integrated multi-cloud using the source configuration for the one or more conflicting values for attributes and a mutually identified configuration for one or more non-conflicting values for attributes of the set of attributes (block 550). For example, the metadata merging platform may generate a target configuration for an integrated multi-cloud using the source configuration for the one or more conflicting values for attributes and a mutually identified configuration for one or more non-conflicting values for attributes of the set of attributes, as described above.

As further shown in FIG. 5, process 500 may include instantiating a set of resources with the target configuration for the multi-cloud computing instance (block 560). For example, the metadata merging platform may instantiate a set of resources with the target configuration for the multi-cloud computing instance, as described above.

As further shown in FIG. 5, process 500 may include providing output identifying the multi-cloud computing instance (block 570). For example, the metadata merging platform may provide output identifying the multi-cloud computing instance, as described above.

Process 500 may include additional implementations, such as any single implementation or any combination of implementations described below and/or in connection with one or more other processes described elsewhere herein.

In a first implementation, process 500 includes merging the first metadata and the second metadata into a third format, and storing the first metadata and the second metadata in the third format in a data structure.

In a second implementation, alone or in combination with the first implementation, process 500 includes identifying a merge error in the multi-cloud computing instance, retrieving the first metadata or the second metadata from the data structure based on identifying the merge error, and altering, based on the first metadata or the second metadata, the target configuration of the multi-cloud computing instance to revert the merge error.

In a third implementation, alone or in combination with one or more of the first and second implementations, process 500 includes receiving information identifying a third configuration of a third cloud computing instance, wherein the third configuration of the third cloud computing instance is associated with third metadata identifying a third set of values for the set of attributes, and merging the third set of values into the target configuration based on the source configuration.

In a fourth implementation, alone or in combination with one or more of the first through third implementations, the set of attributes includes at least one of a set of objects, a set of applications, a set of tabs, a set of groups, a set of queues, a set of templates, a set of processes, a set of pages, a set of classes, a set of profiles, or a set of permissions.

In a fifth implementation, alone or in combination with one or more of the first through fourth implementations, process 500 includes merging the first metadata or the second metadata to a third metadata format using a metadata conversion engine, and wherein generating the target configuration comprises generating the target configuration from the third metadata format.

In a sixth implementation, alone or in combination with one or more of the first through fifth implementations, merging the first metadata or the second metadata comprises tokenizing the first metadata or the second metadata into a set of tokens, parsing the set of tokens using a metadata syntax parser to identify a metadata syntax associated with the set of tokens, determining that the metadata syntax associated with the set of tokens is error-free, and outputting data associated with the metadata syntax based on determining that the metadata syntax is error-free.

In a seventh implementation, alone or in combination with one or more of the first through sixth implementations, process 500 includes receiving training data for merging metadata, wherein the training data includes data identifying a set of merged cloud computing instances associated with metadata in a set of formats, and training a metadata merging model for merging metadata using the training data for merging metadata, and wherein generating the target configuration comprises generating the target configuration using the metadata merging model.

In an eighth implementation, alone or in combination with one or more of the first through seventh implementations, generating the target configuration comprises identifying a dominant state for a metadata type, selecting, from the first metadata and the second metadata, an attribute value corresponding to the dominant state, and including the attribute value in the target configuration.

In a ninth implementation, alone or in combination with one or more of the first through eighth implementations, process 500 includes identifying a set of compatibility rules, and wherein generating the target configuration comprises generating the target configuration based on the set of compatibility rules.

In a tenth implementation, alone or in combination with one or more of the first through ninth implementations, process 500 includes identifying an attribute, of the set of attributes, without a value in the first metadata or the second metadata, and determining a default attribute value for the attribute, and wherein generating the target configuration comprises generating the target configuration based on the default attribute value.

In an eleventh implementation, alone or in combination with one or more of the first through tenth implementations, training the metadata merging model comprises training a set of parsers for a set of attributes corresponding to a set of metadata types, and wherein generating the target configuration comprises parsing the set of attributes using the set of parsers to identify which values from the first metadata and the second metadata to include in the target configuration.

In a twelfth implementation, alone or in combination with one or more of the first through eleventh implementations, generating the target configuration comprises generating a configuration table, filling the configuration table with values from the first metadata or the second metadata, and generating third metadata in a third format based on the configuration table.

In a thirteenth implementation, alone or in combination with one or more of the first through twelfth implementations, instantiating the set of resources comprises instantiating the set of resources based on the third metadata.

In a fourteenth implementation, alone or in combination with one or more of the first through thirteenth implementations, process 500 includes generating a user interface including information identifying a mapping between the target configuration and the first metadata and the second metadata, and wherein providing the output comprises providing the user interface as output.

In a fifteenth implementation, alone or in combination with one or more of the first through fourteenth implementations, process 500 includes receiving, via the user interface, a user selection of a dominant state for a metadata type, selecting, from the first metadata and the second metadata, an attribute value corresponding to the dominant state, and including the attribute value in the target configuration.

In a sixteenth implementation, alone or in combination with one or more of the first through fifteenth implementations, process 500 includes determining a difference metric representing a difference between the first metadata and the second metadata, and including the difference metric in the user interface.

In a seventeenth implementation, alone or in combination with one or more of the first through sixteenth implementations, determining the difference metric comprises analyzing a first attribute value, of the first set of values, and a second attribute value, of the second set of values, to categorize a difference between the first attribute value and the second attribute value, and determining the difference metric based on the categorized difference between the first attribute value and the second attribute value.

In an eighteenth implementation, alone or in combination with one or more of the first through seventeenth implementations, a first attribute, of the set of attributes, is related to a second attribute, of the set of attributes, according to a hierarchy, and the process 500 further comprises identifying a first non-conflicting value, of the one or more non-conflicting values and corresponding to the first attribute, and a second non-conflicting value, of the one or more non-conflicting values and corresponding to the second attribute, based on both the first attribute and the second attribute having non-conflicting values and being related according to the hierarchy.

In a nineteenth implementation, alone or in combination with one or more of the first through eighteenth implementations, a first attribute, of the set of attributes, is related to a second attribute, of the set of attributes, according to a hierarchy, and process 500 further comprises identifying a first conflicting value, of the one or more conflicting values and corresponding to the first attribute, and a second conflicting value, of the one or more conflicting values and corresponding to the second attribute, based on either the first attribute or the second attribute having a conflicting value and being related according to the hierarchy.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A method, comprising:
receiving, by a device, a request to merge a first cloud computing instance with a second cloud computing instance to generate a multi-cloud computing instance;
accessing, by the device, a first application programming interface to obtain a first configuration of the first cloud computing instance,
wherein the first configuration of the first cloud computing instance is associated with first metadata in a first format identifying a first set of values for a set of attributes of the first cloud computing instance;
accessing, by the device, a second application programming interface to obtain a second configuration of the second cloud computing instance,
wherein the second configuration of the second cloud computing instance is associated with second metadata in a second format identifying a second set of values for the set of attributes;
selecting, by the device, a source configuration for one or more conflicting values for attributes of the set of attributes;
generating, by the device, a target configuration for an integrated multi-cloud using the source configuration for the one or more conflicting values for attributes and a mutually identified configuration for one or more non-conflicting values for attributes of the set of attributes; and
instantiating, by the device, a set of resources with the target configuration for the multi-cloud computing instance; and
providing, by the device, output identifying the multi-cloud computing instance.

2. The method of claim 1, further comprising:
merging the first metadata and the second metadata into a third format; and
storing the first metadata and the second metadata in the third format in a data structure.

3. The method of claim 2, further comprising:
identifying a merge error in the multi-cloud computing instance;
retrieving the first metadata or the second metadata from the data structure based on identifying the merge error; and
altering, based on the first metadata or the second metadata, the target configuration of the multi-cloud computing instance to revert the merge error.

4. The method of claim 1, further comprising:
receiving information identifying a third configuration of a third cloud computing instance,
wherein the third configuration of the third cloud computing instance is associated with third metadata identifying a third set of values for the set of attributes; and
merging the third set of values into the target configuration based on the source configuration.

5. The method of claim 1, wherein the set of attributes includes at least one of:
a set of objects,
a set of applications,
a set of tabs,
a set of groups,
a set of queues,
a set of templates,
a set of processes,
a set of pages,
a set of classes,
a set of profiles, or
a set of permissions.

6. The method of claim 1, further comprising:
merging the first metadata or the second metadata to a third metadata format using a metadata conversion engine,
wherein the third metadata format differs from the first metadata and the second metadata with regard to one or more attributes; and
wherein generating the target configuration comprises:
generating the target configuration from the third metadata format.

7. The method of claim 6, wherein merging the first metadata or the second metadata comprises:
tokenizing the first metadata or the second metadata into a set of tokens;
parsing the set of tokens using a metadata syntax parser to identify a metadata syntax associated with the set of tokens;
determining that the metadata syntax associated with the set of tokens is error-free; and
outputting data associated with the metadata syntax based on determining that the metadata syntax is error-free.

8. A device, comprising:
one or more memories; and
one or more processors, coupled to the one or more memories, configured to:
receive training data for merging metadata,
wherein the training data includes data identifying a set of merged cloud computing instances associated with metadata in a set of formats; and
train a metadata merging model for merging metadata using the training data for merging metadata;
receive a request to merge a first cloud computing instance with a second cloud computing instance to generate a multi-cloud computing instance;
access a first application programming interface to obtain a first configuration of the first cloud computing instance,
wherein the first configuration of the first cloud computing instance is associated with first metadata in a first format identifying a first set of values for a set of attributes of the first cloud computing instance;
access a second application programming interface to obtain a second configuration of the second cloud computing instance,
wherein the second configuration of the second cloud computing instance is associated with second metadata in a second format identifying a second set of values for the set of attributes;
select a source configuration for one or more conflicting values for attributes of the set of attributes;
generate, using the metadata merging model, a target configuration for an integrated multi-cloud using the source configuration for the one or more conflicting values for attributes and a mutually identified configuration for one or more non-conflicting values for attributes of the set of attributes; and
instantiate a set of resources with the target configuration for the multi-cloud computing instance; and
provide output identifying the multi-cloud computing instance.

9. The device of claim 8, wherein the one or more processors, to generate the target configuration, are configured to:
identify a dominant state for a metadata type;
select, from the first metadata and the second metadata, an attribute value corresponding to the dominant state; and
include the attribute value in the target configuration.

10. The device of claim 8, wherein the one or more processors are further configured to:
identify a set of compatibility rules; and
wherein the one or more processors, to generate the target configuration, are configured to:
generate the target configuration based on the set of compatibility rules.

11. The device of claim 8, wherein the one or more processors are further configured to:
identify an attribute, of the set of attributes, without a value in the first metadata or the second metadata; and
determine a default attribute value for the attribute; and
wherein the one or more processors, to generate the target configuration, are configured to:
generate the target configuration based on the default attribute value.

12. The device of claim 8, wherein the one or more processors, to train the metadata merging model, are configured to:
train a set of parsers for a set of attributes corresponding to a set of metadata types; and
wherein the one or more processors, to generate the target configuration, are configured to:
parse the set of attributes using the set of parsers to identify which values from the first metadata and the second metadata to include in the target configuration.

13. The device of claim 8, wherein the one or more processors, to generate the target configuration, are configured to:
generate a configuration table;
fill the configuration table with values from the first metadata or the second metadata; and
generate third metadata in a third format based on the configuration table.

14. The device of claim 13, wherein the one or more processors, to instantiate the set of resources, are configured to:
instantiate the set of resources based on the third metadata.

15. A non-transitory computer-readable medium storing a set of instructions, the set of instructions comprising:
one or more instructions that, when executed by one or more processors of a device, cause the device to:
receive a request to merge a first cloud computing instance with a second cloud computing instance to generate a multi-cloud computing instance;
access a first application programming interface to obtain a first configuration of the first cloud computing instance,
wherein the first configuration of the first cloud computing instance is associated with first metadata in a first format identifying a first set of values for a set of attributes of the first cloud computing instance;
access a second application programming interface to obtain a second configuration of the second cloud computing instance,
wherein the second configuration of the second cloud computing instance is associated with second metadata in a second format identifying a second set of values for the set of attributes;
select a source configuration for one or more conflicting values for attributes of the set of attributes;
generate a target configuration for an integrated multi-cloud using the source configuration for the one or more conflicting values for attributes and a mutually identified configuration for one or more non-conflicting values for attributes of the set of attributes; and
instantiate a set of resources with the target configuration for the multi-cloud computing instance;
generate a user interface including information identifying a mapping between the target configuration and the first metadata and the second metadata; and
provide the user interface as output identifying the multi-cloud computing instance.

16. The non-transitory computer-readable medium of claim 15, wherein the one or more instructions further cause the device to:
receive, via the user interface, a user selection of a dominant state for a metadata type;
select, from the first metadata and the second metadata, an attribute value corresponding to the dominant state; and
include the attribute value in the target configuration.

17. The non-transitory computer-readable medium of claim 15, wherein the one or more instructions further cause the device to:
determine a difference metric representing a difference between the first metadata and the second metadata; and
include the difference metric in the user interface.

18. The non-transitory computer-readable medium of claim 17, wherein the one or more instructions, that cause the device to determine the difference metric, cause the device to:
analyze a first attribute value, of the first set of values, and a second attribute value, of the second set of values, to categorize a difference between the first attribute value and the second attribute value; and
determine the difference metric based on the categorized difference between the first attribute value and the second attribute value.

19. The non-transitory computer-readable medium of claim 15, wherein a first attribute, of the set of attributes, is related to a second attribute, of the set of attributes, according to a hierarchy; and
wherein the one or more instructions further cause the device to:
identify a first non-conflicting value, of the one or more non-conflicting values and corresponding to the first attribute, and a second non-conflicting value, of the one or more non-conflicting values and corresponding to the second attribute, based on both the first attribute and the second attribute having non-conflicting values and being related according to the hierarchy.

20. The non-transitory computer-readable medium of claim 15, wherein a first attribute, of the set of attributes, is related to a second attribute, of the set of attributes, according to a hierarchy; and
wherein the one or more instructions further cause the device to:
identify a first conflicting value, of the one or more conflicting values and corresponding to the first attribute, and a second conflicting value, of the one or more conflicting values and corresponding to the second attribute, based on either the first attribute or the second attribute having a conflicting value and being related according to the hierarchy.

* * * * *